J. GLASTAETER.
Receptacle for Printers' Rollers.
No. 216,085.                    Patented June 3, 1879.
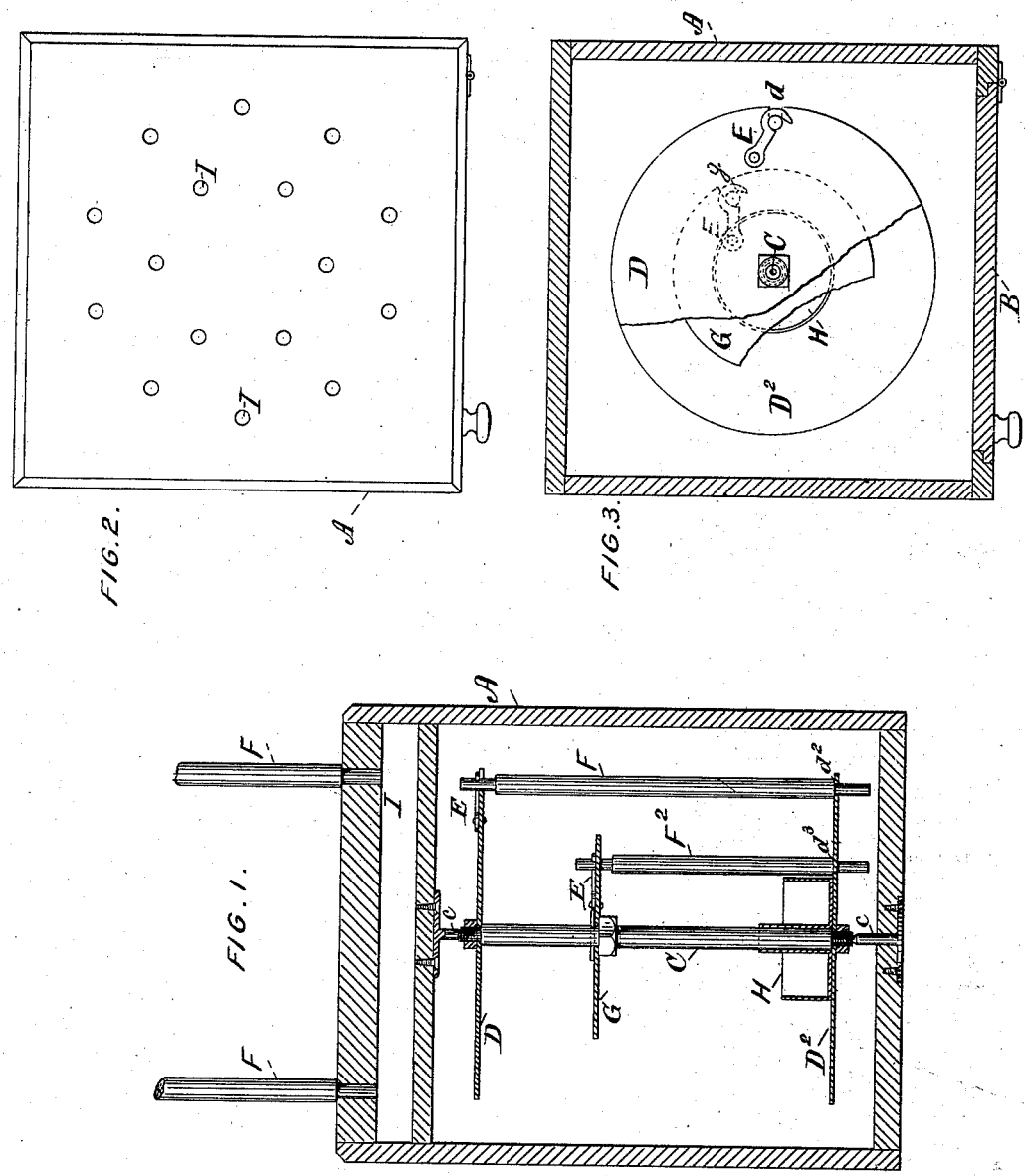
WITNESSES.                                  INVENTOR.

UNITED STATES PATENT OFFICE.

JAMES GLASTAETER, OF RUTHERFORD PARK, NEW JERSEY.

IMPROVEMENT IN RECEPTACLES FOR PRINTERS' ROLLERS.

Specification forming part of Letters Patent No. 216,085, dated June 3, 1879; application filed March 5, 1879.

*To all whom it may concern:*

Be it known that I, JAMES GLASTAETER, of Rutherford Park, Bergen county, New Jersey, have invented, made, and applied to use a new and useful Receptacle for Printers' Composition Inking-Rollers; and that the following is a full, clear, and correct description of the same, reference being had to the accompanying drawings, making part of this specification, and to the letters of reference marked thereon, in which—

Figure 1 is a vertical section of my improved receptacle for printers' composition rollers. Fig. 2 is a top view of the same. Fig. 3 is a top view of the same, a part of the upper portion being broken away.

In the drawings like parts of the invention are pointed out by the same letters of reference.

The nature of the present invention consists in the construction, as more fully hereinafter set forth, of an improved receptacle for printers' composition rollers; the object of the invention being the production of a receptacle for printers' composition rollers, constructed with a view to accommodate a large number of composition rollers compactly or in a small space, and at the same time to protect the composition rollers from the attacks of rats, mice, or vermin, and preserve the same in good condition, thus enabling the printer to use composition rollers for a longer time than if cared for in the usual way.

To enable those skilled in the arts to make and use my invention, I will describe its construction.

A shows the receptacle, made, generally, of wood, and of the proper size for the purpose intended. I prefer that this receptacle should be so constructed that when the door B of the same is closed it shall be air-tight, so that the rollers placed within it shall not be affected by the changes of the atmosphere. B shows the door of the receptacle, hinged to the same as shown, by opening which access is had to the interior. Placed centrally within the receptacle A is the upright shaft C, free to revolve upon the pivots $c$, projecting from the bottom and top of the receptacle A, so that they have a central bearing upon the bottom and top of the shaft C. Secured upon the shaft C at its top and bottom, below and above the pivots $c$, are the disks D and $D^2$, of metal. The disk D has a series of openings, $d$, cut into it from its periphery sufficiently large to allow the ends of the roller-stocks F to be received within them, while the opposite ends of the roller-stocks are passed through circular openings $d^2$ in the disk $D^2$, in line with the openings $d$ in the disk D.

Swiveled upon the upper side of the disk D are the hooks E, used when the roller-stocks are placed in position within the openings $d$ and $d^2$ in the disks D and $D^2$, to keep the upper ends of the roller-stocks in position and prevent their falling or dropping out of place. About midway upon the shaft C is secured a disk, G, of smaller diameter than the disks D and $D^2$, which, like those disks, is provided with a series of openings, $g$, cut into it from its periphery, and in line with a series of openings, $d^3$, in the disk $D^2$.

This disk G has upon its upper side the hooks E, employed for the same purpose as the hooks E used in connection with the disk D, and the object is to accommodate shorter composition rollers $F^2$ than are placed between the disks D and $D^2$, the ends of these rollers being received within the openings $g$ and the openings $d^3$ in the disk $D^2$.

H shows a circular cup placed over the shaft C, and resting upon the disk $D^2$, intended to be filled with water when desired, and I are a series of openings in the top of the receptacle A, in which, for the purpose of seasoning the rollers, the ends of the stocks may be inserted.

Such being the construction, the operation will be easily understood. The ends of the roller-stocks are placed in the openings in the disk $D^2$, and their upper ends in the openings in the disks D and G, the long rollers between the disks D and $D^2$, and the short rollers between the disks G and $D^2$, the shaft C and disks D, $D^2$, and G being revolved to allow of the insertion of the rollers. After being so positioned, the hooks E are turned so as to retain the roller-stocks in position.

The stocks are easily removed from the position they occupy between the disks by throwing aside the hooks and lifting them out of the openings in the disks.

When desired to keep the rollers moist, the circular cup H may be filled, or partially filled, with water.

By such a construction of receptacle for printers' composition rollers, I am enabled to keep a large number of rollers in proper condition for use in a compact receptacle, and one in which space is economized, and one from which any particular roller can be selected when wanted by simply revolving the shaft C until the roller is brought into position for removal.

The rollers contained in a closed receptacle are free from the attacks of rats, mice, and vermin, and are not affected by atmospheric changes when not in use, and their efficiency is enhanced.

Having now set forth my invention, what I claim as new is—

The combination, with the receptacle A, of the revolving shaft C, having fixed upon it the disks D, G, and $D^2$, provided with openings, as shown, the hooks E, and the circular cup H, constructed and operating as and for the purpose set forth.

JAMES GLASTAETER.

In presence of—
　WILLIAM V. H. HICKS,
　A. SIDNEY DOANE.